United States Patent
Balnis

(10) Patent No.: US 10,857,700 B2
(45) Date of Patent: Dec. 8, 2020

(54) TIRE HAVING COMPONENT WITH RELEASE COATED SURFACE AND RELATED PROCESSES

(71) Applicant: Bridgestone Americas Tire Operations, LLC, Nashville, TN (US)

(72) Inventor: Craig R. Balnis, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 448 days.

(21) Appl. No.: 15/814,619

(22) Filed: Nov. 16, 2017

(65) Prior Publication Data

US 2018/0133934 A1 May 17, 2018

Related U.S. Application Data

(60) Provisional application No. 62/423,406, filed on Nov. 17, 2016.

(51) Int. Cl.
| | |
|---|---|
| B29C 33/64 | (2006.01) |
| B60C 1/00 | (2006.01) |
| C09D 183/04 | (2006.01) |
| B60C 19/00 | (2006.01) |
| B60C 17/00 | (2006.01) |
| B60C 5/14 | (2006.01) |
| B29D 30/06 | (2006.01) |

(52) U.S. Cl.
CPC ............ *B29C 33/64* (2013.01); *B60C 1/0008* (2013.01); *B60C 5/14* (2013.01); *B60C 17/0009* (2013.01); *B60C 19/002* (2013.01); *C09D 183/04* (2013.01); *B29D 30/0654* (2013.01); *B60C 2001/0033* (2013.01)

(58) Field of Classification Search
CPC ......... B29C 33/64; B60C 1/0008; B60C 5/14; B60C 17/0009; B60C 19/002; B60C 2001/0033; C09D 183/04; B29D 30/0654
See application file for complete search history.

(56) References Cited

U.S. PATENT DOCUMENTS

| | | | |
|---|---|---|---|
| 4,863,650 | A | 9/1989 | Kohler et al. |
| 2001/0004924 | A1* | 6/2001 | Aoki ................. B60C 5/004 |
| | | | 156/394.1 |
| 2009/0114329 | A1* | 5/2009 | Tomoi .................. B29C 33/68 |
| | | | 152/510 |
| 2009/0308523 | A1 | 12/2009 | Kuramori |
| 2012/0125525 | A1 | 5/2012 | Majumdar et al. |
| 2013/0032262 | A1 | 2/2013 | Bormann et al. |
| 2014/0216621 | A1 | 8/2014 | Welter et al. |

FOREIGN PATENT DOCUMENTS

EP     0385919 B1    1/1994

OTHER PUBLICATIONS

Rovene® 6005: SDS, PDF Downloads, and Physical Properties—Mallard Creek Polymers, downloaded from http://www.mcpolymers.com in Feb. 2016 (1 page).
Mallard Creek Polymers ROVENEÂ® 6005 Acrylic Emulsion information sheet, downloaded from www.lookpolymers.com in Feb. 2016 (1 page).
Lyndcoat brochure by Bluestar Silicones, downloaded from https://www.siliconiitalia.it/public/brochure/426/A4_BluestarSilicones-Lyndcoat_BD.pdf in Feb. 2016 (4 pages).
Lyndcoat BR 1812 RTU by Bluester Silicones, copyright Sep. 2010 (2 pages).
Lyndcoat BR 1812, Safety Data Sheet, revision date Jun. 16, 2015 (9 pages).
"Adhesives," downloaded from http://nciz.org.nz/ChemProcesses/polymers/10H.pdf in Feb. 2016 (11 pages).

* cited by examiner

*Primary Examiner* — Andrew J. Oyer
(74) *Attorney, Agent, or Firm* — Meredith E. Hooker; Jenny L. Sheaffer

(57) ABSTRACT

Disclosed herein are a tire comprising at least one component having a surface coated with a liquid release layer, a process for preparing a tire having at least one component with a surface coated with a release layer, and a cured tire comprising a tire body at least one component with a surface coated with a release layer. The release layer comprises at least one silicone rubber and at least one adhesive polymer which may be present in latex form in the liquid release layer.

20 Claims, No Drawings

TIRE HAVING COMPONENT WITH RELEASE COATED SURFACE AND RELATED PROCESSES

FIELD

The present application is directed to a tire comprising at least one component having a surface coated with a release layer of specified composition, and processes for preparing such tires.

BACKGROUND

As part of the tire manufacturing process, a green or uncured tire containing green or uncured components such as an inner liner or a body ply is subjected to heat and pressure in a tire mold to produce a cured tire. Within the tire mold, a rubber bladder expands and presses against the inner surface of the inner liner or the body ply. The heat and pressure within the tire mold can cause the inner surface of the inner liner or body ply to adhere or stick to the rubber bladder. In order to prevent this unwanted adhesion, the outer surface of the rubber bladder, the inner surface of the inner liner (or body ply), or the surfaces of both can be treated with a release agent. Prior to mounting upon a vehicle, certain cured tires may be fitted with a foam component positioned radially inner of the inner liner. This foam component may be referred to as a foam noise damper because it acts to reduce or dampen road noise that is emitted by the rotating tires. Alternatively or additionally, a spray-on air barrier and/or a sealant may be applied to the radially inner surface of the inner liner and/or body ply, prior to the installation of the tire on a vehicle. Because these components (i.e., the foam noise damper, the spray-on air barrier, and sealant) are positioned in contact with the radially inner surface of the inner liner or body ply, the chemical composition of any release agent used on the inner surface of the inner liner or body ply has the potential to affect those components and the processes used to add them to the tire.

SUMMARY

Disclosed herein are tires comprising at least one component having a surface coated with a release layer of specified composition, and processes for preparing such tires.

In a first embodiment, a tire comprising at least one component having a surface coated with a liquid release layer is disclosed. The liquid release layer comprises at least one silicone rubber latex and at least one adhesive polymer latex.

In a second embodiment, a process for preparing a tire having at least one component with a surface coated with a release layer is disclosed. The process comprises: (a) providing a tire component having an upper surface and lower surface wherein the lower surface is positioned radially inward within the tire, (b) providing a liquid mixture of at least one silicone rubber latex and at least one adhesive polymer latex, and (c) coating the lower surface of the tire component with the liquid mixture to provide a release layer thereon.

In a third embodiment, a cured tire comprising a tire body and at least one component with a surface coated with a release layer, the at least one component selected from an inner liner, a body ply and a run-flat insert is disclosed. The component has an upper surface and lower surface with the lower surface positioned radially inward within the tire, wherein the lower surface is coated with a release layer comprising at least one silicone rubber and at least one adhesive polymer latex, and the upper surface of the component is positioned radially outward within the tire.

DETAILED DESCRIPTION

Disclosed herein are tires comprising at least one component having a surface coated with a release layer of specified composition, and processes for preparing such tires.

In a first embodiment, a tire comprising at least one component having a surface coated with a liquid release layer is disclosed. The liquid release layer comprises at least one silicone rubber latex and at least one adhesive polymer latex.

In a second embodiment, a process for preparing a tire having at least one component with a surface coated with a release layer is disclosed. The process comprises: (a) providing a tire component having an upper surface and lower surface wherein the lower surface is positioned radially inward within the tire, (b) providing a liquid mixture of at least one silicone rubber latex and at least one adhesive polymer latex, and (c) coating the lower surface of the tire component with the liquid mixture to provide a release layer thereon.

In a third embodiment, a cured tire comprising a tire body and at least one component with a surface coated with a release layer, the at least one component selected from an inner liner, a body ply and a run-flat insert is disclosed. The component has an upper surface and lower surface with the lower surface positioned radially inward within the tire, wherein the lower surface is coated with a release layer comprising at least one silicone rubber and at least one adhesive polymer latex, and the upper surface of the component is positioned radially outward within the tire.

Definitions

The terminology as set forth herein is for description of the embodiments only and should not be construed as limiting the invention as a whole.

As used herein, the term "natural rubber" means naturally occurring rubber such as can be harvested from sources such as Hevea rubber trees and non-Hevea sources (e.g., guayule shrubs and dandelions such as TKS). In other words, the term "natural rubber" should be construed so as to exclude synthetic polyisoprene.

As used herein, "nitrogen surface area" refers to the nitrogen absorption specific surface area ($N_2SA$) of a particulate material, including but not limited to the carbon black and "non-reinforcing fillers" of particulate material discussed herein. The nitrogen surface area can be determined by various standard methods including those mentioned below.

As used herein, the term "phr" means parts per one hundred parts rubber. In certain embodiments, the 100 parts rubber should be understood to refer to 100 parts of the at least one diene based elastomer. 100 parts of rubber may also be referred to as 100 phr.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber, or dandelion-sourced natural rubber). However, the term polyisoprene should be construed as including polyisoprenes manufactured from natural sources of isoprene monomer.

As used herein the term "thermoplastic" as in the phrase "thermoplastic adhesive polymer" is used to indicate a compound which softens upon heating and can generally be molded or shaped in its softened state.

Tires (with at Least One Component Having a Coated Surface)

As discussed above, the first embodiment disclosed herein is directed to a tire comprising at least one component having a surface coated with a liquid release layer is disclosed. In certain embodiments of the first embodiment, the surface of the component that is coated with the liquid release layer can be understood as the radially inward facing surface (positioned radially inward) of the component. The second embodiment disclosed herein is directed to a process for preparing a tire having at least one component with a surface coating. According to certain embodiments of the first and second embodiments, the at least one tire component having a coated surface may comprise at least one of an inner liner layer, a body ply, or a run-flat insert. The third embodiment disclosed herein is directed to a cured tire comprising a tire body and at least one component with a coated surface selected from an inner liner, a body ply and a run-flat insert is disclosed. The component has an upper and a lower surface with the lower surface positioned radially inward (radially inward facing) within the tire and the lower surface is coated with a release layer comprising at least one silicone rubber and at least one adhesive polymer latex and the upper surface of the component is positioned radially outward (radially outward facing) within the tire. As discussed above, according to the first embodiment, the surface of the component is coated with a liquid release layer comprising at least one silicone rubber latex and at least one adhesive polymer latex. The release layer is described as a liquid release layer because it is in liquid form when it is applied to the rubber inner liner layer. However, it should be understood that the liquid release layer will dry after application to the surface of the tire component such that within a finished (or cured) tire it can be described simply as a release layer.

While the first, second and third embodiments refer to a component having "a surface coated" it should be understood that 100% of the area of the surface of that component need not be continuously coated or 100% coated in order to constitute a coated surface of "a surface coated." Preferably, about 90% to 100% of the area of the surface of the component is coated with the release layer, including at least 90%, at least 92%, at least 95%, at least 98%, at least 99%, at least 99.5%, or even 100% of the surface area of the component.

Inner Liner Layer

In certain embodiments of the first-third embodiments disclosed herein, the at least one tire component having a surface coating comprises an inner liner layer. As those of skill in the art will understand, an inner liner layer is utilized in a tire to prevent air that is inside the tire from escaping through the tire rubber and into the outside environment which will lead to an undesirable decrease in tire pressure. According to the first-third embodiments, the composition of the rubber inner liner layer (i.e., the uncoated portion or the inner liner layer prior to coating) may vary and may include one or more rubbers as well as other ingredients. The other ingredients of the inner liner layer may vary but will generally include one or more fillers (e.g., carbon black, clay or silica) and a cure package (e.g., a vulcanizing agent such as sulfur and one or more vulcanization accelerators). Generally, according to the first-third embodiments, the rubber of the rubber inner liner layer will include at least one of: a butyl rubber or halogenated butyl rubber. In other words, the rubber of the rubber inner liner layer may comprise one or more than one butyl rubber, one or more than one halogenated butyl rubber, or a combination thereof. Butyl rubber is a copolymer of isobutylene and a small amount of a diene-based monomer, typically isoprene or para-methylstyrene. The polymer chains of butyl rubber therefore typically have a highly saturated backbone. Butyl rubber typically contains more than about 90% isobutylene and less than about 10% diene-based monomer (e.g., isoprene or para-methylstyrene) by weight in the copolymer, including about 90-99.5% isobutylene and about 10 to about 0.5% diene-based monomer, about 95-99.5% isobutylene and about 5-0.5% diene-based monomer, about 96-99% isobutylene and about 4-1% diene-based monomer, about 97-98.5% isobutylene and about 1.5-3% diene-based monomer, and including about 98% isobutylene and about 2% diene-based monomer by weight in the copolymer. Typically, the diene-based mer (e.g., isoprenyl or para-methylstyrenyl) units are distributed randomly in the polymer chains of butyl rubber. Non-limiting examples of suitable polymers for use as the at least one butyl rubber or a halogenated butyl rubber according to certain embodiments of the first-third embodiments disclosed herein include, but are not limited to, butyl rubber, chlorobutyl rubber, bromobutyl rubber, fluorobutyl rubber, iodobutyl rubber, copolymers thereof, and combinations thereof. In certain embodiments of the first-third embodiments, the rubber inner liner layer comprises bromobutyl rubber. In certain embodiments of the first-third embodiments, the rubber of the rubber inner liner layer comprises at least 60% by weight (e.g., 60%, 65%, 70%, 75%, 80%, 85%, 90%, 95% or 100% by weight) of at least one of: a butyl rubber or halogenated butyl rubber (or a combination thereof, as discussed above). In certain embodiments of the first-third embodiments, the rubber of the rubber inner liner layer comprises at least one of the following rubbers either in addition to the butyl or halogenated butyl rubber or in substitution for the butyl or halogenated butyl rubber: natural rubber, polyisoprene, styrene-butadiene rubber, isoprene rubber, polybutadiene rubber, nitrile rubber (acrylonitrile-butadiene copolymers), or hydrogenated nitrile rubber.

Body Ply

In certain embodiments of the first-third embodiments disclosed herein, the at least one tire component having a surface coating comprises a body ply. While tires may have various constructions with one or more than one body ply, the body ply referred to herein as having the surface coating of the release layer is positioned radially inward within the layers of the tire and in certain embodiments represents the most radially inward layer within the tire. By radially inward is meant radially inner of the road-contacting tread. Generally, a tire comprises a pair of annular beads and the body ply is wrapped circumferentially around the tire and extends from bead to bead, in certain embodiments extending around the beads. According to the first-third embodiments, the composition of the body ply (i.e., the uncoated portion or the body ply prior to coating) may vary and may include one or more rubbers as well as other ingredients. In certain embodiments of the first-third embodiments, the body ply comprises a layer comprising rubber-covered metal (e.g., steel) or textile cords. In certain embodiments of the first-third embodiments, the body ply comprises a layer comprising rubber-covered metal cords. In other embodiments of the first-third embodiments, the body ply comprises a layer comprising rubber-covered textile cords. The other ingredients present in the body ply may vary but will generally include one or more fillers (e.g., carbon black, or silica) and a cure package (e.g., a vulcanizing agent such as sulfur and one or more vulcanization accelerators). In certain embodiments of the first-third embodiments, the rubber of the body ply comprises at least one conjugated diene monomer-containing rubber. Suitable such rubbers are well-known to those of skill in the art and include, but are not limited to natural rubber, polyisoprene, styrene-butadiene rubber, polybutadiene rubber, styrene-isoprene rubber, butadiene-isoprene-rubber, styrene-isoprene-butadiene rubber, acrylonitrile, and nitrile rubber. In certain embodiments of the first-third embodiments, the rubber of the body ply comprises at least one of the foregoing rubbers. In certain embodiments of the first-third embodiments, the rubber of the body ply comprises at least 51% by weight natural rubber and/or polyisoprene (i.e., the total amount of natural rubber+polyisoprene is at least 51% although each need not be present), at least 55%, at least 60%, at least 65%, at least 70%, at least 75%, at least 80%, at least 90%, at least 95% or even 100% by weight of natural rubber or polyisoprene. In certain embodiments of the first-third embodiments, the rubber of the body ply comprises at least 51% by weight natural rubber, at least 55%, at least 60%, at least 65%, at least 70%, at least 75%, at least 80%, at least 90%, at least 95% or even 100% by weight of natural rubber.

Run-Flat Insert

In certain embodiments of the first-third embodiments disclosed herein, the at least one tire component having a surface coating comprises a run-flat insert. In certain such embodiments, the run-flat insert comprises a self-supporting run-flat insert such as may be used in the sidewall of a tire to produce a run-flat tire or self-supporting run-flat tire. A run-flat insert that is used in the sidewall of a tire may be positioned either axially inward or axially outward of the body ply. In certain embodiments of the first-third embodiments, the run-flat insert will comprise the radially innermost (or axially innermost) component in the sidewall portion of the tire; in certain such embodiments, either the inner liner or the body ply will comprise the radially innermost component in the remaining portion of the tire.

Foam Noise Damper

In certain embodiments of the first-third embodiments disclosed herein, the at least one tire further comprises a foam noise damper. As those of skill in the art will understand, a foam noise damper is a foam component that may be fitted into a tire after manufacture but prior to installation of the tire onto a vehicle. The foam noise damper acts to reduce or dampen road noise that is emitted by the mounted tires when they rotate in operation on a vehicle. In certain embodiments of the first-third embodiments, at least a portion of the foam noise damper contacts at least a portion of the coated radially inner surface of an inner liner layer. In such embodiments, the release layer coating present on the radially inner surface of inner liner layer allows for improved bonding of the foam noise barrier to the inner liner layer.

Release Layer

As discussed above, the tire of the first embodiment and the process of the second embodiment include at least one component having a surface coated with a release layer. The cured tire of the third embodiment comprises at least one component with a surface coated with a release layer, which can be understood as resulting from coating of the lower surface of the component a liquid mixture, resulting in a liquid release layer which is in a dry state within the cured tire. Once the liquid mixture or liquid release layer has dried upon the surface of the tire component, the release layer is intended to remain; in other words, the release layer is not intended to be removed from the surface of the rubber inner liner layer. According to the first-third embodiments, the release layer comprises at least one silicon rubber and at least one adhesive polymer. One or more than one silicone rubber may be utilized in combination with one or more than one adhesive polymer. According to the first embodiment, since the release layer is liquid (i.e., it has not dried), the liquid release layer can be understood as comprising at least one silicone rubber latex and at least one adhesive polymer latex. Similarly, according to the second embodiment, which is directed to a method for preparing a tire comprising at least one component with a surface coated with a release layer, the liquid mixture that is applied to the surface of the tire component can be understood as comprising at least one silicone rubber latex and at least one adhesive polymer latex. As used herein, the term latex should be understood to encompass a rubber-solvent mixture wherein the solvent may be aqueous (e.g., water) or hydrocarbon (e.g., a non-polar solvent). In certain embodiments of the first and second embodiments, both the at least one silicone rubber latex and the at least one adhesive polymer latex are water-based; the use of water-based latexes can offer certain environmental advantages in that their drying does not lead to release of hydrocarbon solvents into the surrounding environment.

In certain embodiments of the first and second embodiments, the relative amounts of silicone rubber and adhesive polymer can be understood by reference to the amount of each component in the liquid release layer or liquid mixture used to apply the liquid release layer. Generally, according to the first and second embodiments, the liquid release layer (or the liquid mixture used to apply the liquid release layer) comprises at least one silicon rubber (e.g., in latex form), at least one adhesive polymer (e.g., in latex form) and at least one solvent (which solvent may result from the latexes used or may also be added at least in part as a separate or additional solvent).

In certain embodiments of the first and second embodiments, the liquid release layer or the liquid mixture used to apply the liquid release layer contains silicone rubber in an amount of 5-25% (e.g., 5%, 6%, 7%, 8%, 9%, 10%, 11%, 12%, 13%, 14%, 15%, 16%, 17%, 18%, 19%, 20%, 21%, 22%, 23%, 24%, or 25%) by weight (based upon the total weight of the liquid release layer or the liquid mixture) and adhesive polymer in an amount of 10-50% (e.g., 10%, 12%, 15%, 17%, 20%, 22%, 25%, 27%, 30%, 32%, 35%, 37%, 40%, 42%, 45%, 47%, or 50%) by weight (based upon the total weight of the liquid release layer or the liquid mixture). In certain embodiments of the first and second embodiments, the liquid release layer or the liquid mixture used to apply the liquid release layer contains silicone rubber in an amount of 10-20% (e.g., 10%, 11%, 12%, 13%, 14%, 15%, 16%, 17%, 18%, 19%, or 20%) by weight (based upon the total weight of the liquid release layer or the liquid mixture), and adhesive polymer in an amount of 15-40% (e.g., 15%, 17%, 20%, 22%, 25%, 27%, 30%, 32%, 35%, 37%, or 40%) by weight (based upon the total weight of the liquid release layer or the liquid mixture). In certain embodiments of the first and second embodiments, the remaining portion of the liquid release layer or liquid mixture (i.e., the amount needed to constitute an entire 100% by weight) is comprised of one or more solvents (such as discussed above). In certain embodiments of the first and second embodiments, the liquid release layer or the liquid mixture comprises 25-85% (e.g., 25%, 30%, 35%, 40%, 45%, 50%, 55%, 60%, 65%, 70%, 75%, 80%, or 85%) by weight solvent or 40-75% (e.g., 40%, 45%, 50%, 55%, 60%, 65%, 70%, or 75%) by weight solvent (based upon the total weight of the liquid release layer or the liquid mixture). In certain embodiments of the first and second embodiments, no more than 5% by weight of the liquid release layer or the liquid mixture comprises hydrocarbon solvent. In other words, in such embodiments, the liquid release layer or the liquid mixture contains no more than 5% by weight of hydrocarbon solvent (based upon the total weight of the liquid release layer or the liquid mixture). In certain embodiments of the first and second embodiments, the liquid release layer or the liquid mixture comprises at least one filler; in certain such embodiments, the at least one filler comprises at least one of carbon black or silica. In certain embodiments of the first and second embodiments, the liquid release layer or the liquid mixture contains no more than 10% by weight, no more than 5% by weight, no more than 2% by weight, no more than 1% by weight, or 0% by weight (based upon the total weight of the liquid release layer or the liquid mixture) of any filler selected from the group consisting of talc, kaolin, chalk, graphite, rock dust, mica, zinc oxide, titanium oxide, magnesium oxide, silica, calcium carbonate, alumina, and carbon black. In other words, in such embodiments, the total amount of the foregoing fillers is no more than specified.

In certain embodiments of the first and second embodiments, the liquid release layer or the liquid mixture contains a weight amount of silicone rubber to weight amount of adhesive polymer of at least 0.5:1, including at least 0.6:1, at least 1:1.5 (this ratio can also be understood as at least 0.67:1), at least 0.7:1, at least 0.8:1, at least 0.9:1, at least 1:1, at least 1.5:1, at least 2:1, at least 2.5:1, and at least 3:1. In certain embodiments of the first and second embodiments, the liquid release layer or the liquid mixture contains a weight amount of silicone rubber to weight amount of adhesive polymer of at least 1:1, including 1.1:1, 1.2:1, 1.3:1, 1.4:1, 1.5:1, 1.6:1, 1.7:1, 1.8:1, 1.9:1, 2:1, 2.5:1, 3:1, 3.5:1, 4:1 and 5:1. In certain embodiments of the first and second embodiments, the liquid release layer or the liquid mixture contains a weight amount of silicone rubber to weight amount of adhesive polymer of 0.5:1 to 5:1, 0.5:1 to 4:1, 0.5:1 to 3:1, 1:1 to 5:1, 1:1 to 4:1, or 1:1 to 5:1. In certain embodiments of the first and second embodiments, the liquid release layer or liquid mixture contains an amount by weight of silicone rubber as discussed above, an amount by weight of silicone rubber as discussed above, and a weight amount of silicone rubber to weight amount of adhesive polymer according to one of the foregoing ranges. As a non-limiting example, in certain embodiments of the first and second embodiments, the liquid release layer or the liquid mixture contains silicone rubber in an amount of 5-25% by weight (based upon the total weight of the liquid release layer), adhesive polymer in an amount of 10-50% by weight (based upon the total weight of the liquid release layer) and the weight amount of silicone rubber to weight amount of adhesive polymer is at least 0.5:1.

The amount of at least one silicone rubber and at least one adhesive polymer that is present in the release layer that is surface coated on the at least one component of the tire can be understood in terms of the relative amount of silicone rubber to amount of adhesive polymer. As discussed above, since the tire of the third embodiment is cured, the release layer is dried and all or substantially all of the solvent that was contained within the liquid release layer or the liquid mixture used to apply the liquid release layer has evaporated. In certain embodiments of the third embodiment, the release layer contains a weight amount of silicone rubber to weight amount of adhesive polymer of at least 0.5:1, including at least 0.6:1, at least 1:1.5 (this ratio can also be understood as at least 0.67:1), at least 0.7:1, at least 0.8:1, at least 0.9:1, at least 1:1, at least 1.5:1, at least 2:1, at least 2.5:1, and at least 3:1. In certain embodiments of the third embodiment, the release layer contains a weight amount of silicone rubber to weight amount of adhesive polymer of at least 1:1, including 1.1:1, 1.2:1, 1.3:1, 1.4:1, 1.5:1, 1.6:1, 1.7:1, 1.8:1, 1.9:1, 2:1, 2.5:1, 3:1, 3.5:1, 4:1 and 5:1. In certain embodiments of the third embodiment, the release layer contains a weight amount of silicone rubber to weight amount of adhesive polymer of 0.5:1 to 5:1, 0.5:1 to 4:1, 0.5:1 to 3:1, 1:1 to 5:1, 1:1 to 4:1, or 1:1 to 5:1. As those of skill in the art will appreciate, the amounts of silicone rubber latex and adhesive polymer latex needed to achieve the foregoing amounts of silicone rubber and adhesive polymer in the release layer will vary depending upon the concentration of the silicone rubber in its latex solution and the concentration of the adhesive polymer in its latex solution. Exemplary concentrations for each latex are discussed below.

Silicone Rubber and Silicone Rubber Latex

As discussed above, the release layer of the first and second embodiments comprises at least one silicone rubber latex and the release layer of the third embodiment comprises at least one silicone rubber. A silicone rubber latex can be understood as including silicone rubber and at least one solvent. Preferably, the silicone rubber latex contains silicone rubber that is sufficiently solubilized or dispersed to remain in solution (e.g., it does not precipitate or unduly settle out of the solution). In certain embodiments of the first and second embodiments, the at least one silicone rubber latex comprises at least one surfactant, at least one emulsifier, or a combination thereof. In certain embodiments of the first and second embodiments, the at least one silicone rubber latex is aqueous, i.e., it comprises water as a solvent. In certain embodiments of the first and second embodiments, the at least one silicone rubber latex is non-aqueous, i.e., it comprises a solvent other than water (e.g., a hydrocarbon solvent). In certain embodiments of the first and second embodiments, the solvent of at least one silicone rubber latex comprises at least 90% by weight water, at least 95% by weight water, at least 98% by weight water, at least 99% by weight water, or 100% weight water. Generally, silicone rubbers will be more soluble in non-polar hydrocarbon solvents. In certain embodiments of the first and second embodiments, the hydrocarbon solvent of the silicone rubber latex comprises at least one of the following: toluene, xylene, solvent naphtha, mineral spirits, kerosene, gasoline, hexane (e.g., cyclohexane, n-hexane, iso-hexane or a combination thereof), benzene, n-heptane, diisopropyl ether, hexyl ether, ethyl acetate, butyl acetate, isopropyl laurate, isopropyl palmitate, isopropyl myristate, methyl ethyl ketone, methyl isobutyl ketone, lauryl alcohol, or organic oils. Exemplary organic oils include those comprised of a majority of fatty acids (e.g., free fatty acid, fatty acids in monoglyceride form, fatty acids in diglyceride form, fatty acids in triglyceride form, and combinations thereof) as well as those comprised of a majority of terpenes (e.g., limonene, d-limonene, alpha-pinene, beta-pinene, beta-myrcene, gamma-terpene, and combinations thereof). Exemplary organic oils comprising a majority of fatty acids include: soy or soybean oil, sunflower oil (optionally having an oleic acid content of at least 60%, at least 70%, or at least 80% by weight oleic acid), safflower oil, corn oil, peanut oil, olive oil, grape seed oil, hazelnut oil, rice oil, safflower oil, sesame oil, mustard oil, flax oil, linseed oil, cotton seed oil, rapeseed oil, cashew oil, sesame oil, *camellia* oil, jojoba oil, macadamia nut oil, coconut oil, palm kernel oil, and palm oil. The organic oil may comprise a combination of plant oils such as more than one of the foregoing plant oils; such a combination of plant oils is sometimes called a vegetable oil. Exemplary organic oils comprising a majority of terpenes include citrus oils (e.g., orange oil, lemon oil, lime oil, grapefruit oil) and pine oils.

According to the first and second embodiments, the concentration of the silicone rubber in the silicone rubber latex may vary. One or more than one silicone rubber may be present in the silicone rubber latex and when more than one is present, the following concentrations should be understood to refer to the total amount of all silicone rubbers present in the latex. In certain embodiments of the first and second embodiments, the silicone rubber latex comprises 10-80% (e.g., 10%, 15%, 20%, 25%, 30%, 35%, 40%, 45%, 50%, 55%, 60%, 65%, 70%, 75%, or 80%) by weight silicone rubber, or 10-60% (e.g., 10%, 15%, 20%, 25%, 30%, 35%, 40%, 45%, 50%, 55%, 60%) by weight silicone rubber (based upon the total weight of the silicone rubber latex).

The particular type of silicone rubber or silicone rubbers used in the first-third embodiments may vary. A general formula for a silicone rubber can be considered as $(R^1R^2SiO)x$ where $R^1$ and $R^2$ may be the same or different and each comprises any one of a variety of organic groups and x is an integer of at least three; in certain embodiments of the first-third embodiments, the at least one silicone rubber has the foregoing formula. A silicone rubber differs from an organic polymer in that a silicone rubber lacks carbon in its polymer backbone. However, the organic groups (i.e., $R^1$ and $R^2$) that are attached to the silicon generally contain carbon. In certain embodiments of the first-third embodiments, $R^1$ and $R^2$ are independently selected from alkyls having 1-20 carbons, aryls having 6-20 carbons, and combinations thereof. In certain embodiments of the first-third embodiments, at least one of $R^1$ and $R^2$ is selected from alkyls having 1-10, 1-6, 1-3, or 1-2 (i.e., methyl or ethyl) carbons. In certain embodiments of the first-third embodiments, $R^1$ and $R^2$ are the same. Non-limiting examples of suitable silicone rubbers for use in the first-third embodiments include polydimethylsiloxanes. In certain embodiments of the first-third embodiments, a portion of the $R^1$ or $R^2$ groups is replaced with $R^3$ groups wherein $R^3$ comprises a functionalized hydrocarbyl group (e.g., having a —OH or an amine functionality). In certain embodiments of the first-third embodiments, x is an integer of 50-2000 (e.g., 50, 100, 150, 200, 300, 400, 500, 600, 700, 800, 900, 1000, 1100, 1200, 1300, 1400, 1500, 1600, 1700, 1800, 1900, 2000), 50-1500, 50-1200, 50-1000, 100-2000, 100-1500, 100-1200, or 100-1000.

Adhesive Polymer Latex and Adhesive Polymer

As discussed above, the release layer of the first and second embodiments comprises at least one adhesive polymer latex and the release layer of the third embodiment comprises at least one adhesive polymer. One or more than one adhesive polymer may be utilized. Similarly, one or more than one adhesive polymer latex may be utilized (each containing one or more than one adhesive polymer.) Thus, each of the first-third embodiments can be understood to include at least one adhesive polymer. In certain embodiments of the first-third embodiments, the at least one adhesive polymer latex comprises a thermoplastic adhesive polymer latex (i.e., contains at least one thermoplastic adhesive polymer). In certain embodiments of the first-third embodiments, the at least one adhesive polymer latex comprises a thermoset adhesive polymer latex (i.e., contains at least one thermoplastic adhesive polymer such as a rubber).

Preferably, the adhesive polymer latex contains at least one adhesive polymer that is sufficiently solubilized or dispersed to remain in solution (e.g., it does not precipitate or unduly settle out of the solution). In certain embodiments of the first and second embodiments, the at least one silicone rubber latex comprises at least one surfactant, at least one emulsifier, or a combination thereof. In certain embodiments of the first and second embodiments, the at least one adhesive polymer is aqueous, i.e., it comprises water as a solvent. In certain embodiments of the first and second embodiments, the at least one adhesive polymer latex is non-aqueous, i.e., it comprises a solvent other than water (e.g., a hydrocarbon solvent). In certain embodiments of the first and second embodiments, the solvent of at least one adhesive polymer latex comprises at least 90% by weight water, at least 95% by weight water, at least 98% by weight water, at least 99% by weight water, or 100% weight water. Suitable solvents, including hydrocarbon solvents will depend upon the particular adhesive polymer or polymers present in the adhesive polymer latex.

The particular type of adhesive polymer utilized in the first-third embodiments may vary. In certain embodiments of the first-third embodiments, the adhesive polymer utilized can be considered a thermoplastic resin. In certain embodiments of the first-third embodiments, the at least one adhesive polymer is selected from at least one of: acrylates (including polyalkylalkyl-acrylates, alkyl-acrylates), polyamides, polyesters, polynitriles, polyvinyls, cellulose-based, fluoro-based, imides, polyurethanes, phenol formaldehydes, polyolefins, and combinations thereof.

In certain embodiments of the first-third embodiments, the at least one adhesive polymer comprises an acrylate. Acrylate polymers are a type of vinyl polymer and are comprised of acrylate monomers. Acrylate monomers are esters which contain vinyl groups, directly attached to the carbonyl carbon. Some acrylates monomers have an extra methyl group attached to the alpha carbon, and these are alkylacrylates. Most commonly, acrylate polymers are derived from acrylic acid, alkylacrylic acid (e.g., methacrylic acid), or alkyl-alkylacrylic acids. Thus, acrylate polymers include polyacrylates, polyalkyl-acrylates, and polyalkyl-alkylacrylates. In certain embodiments of the first-third embodiments, the at least one adhesive polymer comprises at least one acrylate selected from: polyacrylic acid (PAA), polymethyl methacrylate (PMMA), polymethacrylate (PMA), polypropylacrylate (PAA), or polyethylacrylate.

In certain embodiments of the first-third embodiments, the at least one adhesive polymer comprises a polyamide. Generally, a polyamide polymer has repeating units linked together by an amide bond. An amide bond can be considered as a functional group of formula $R_nE(O_x)NR^1_2$ wherein R and $R^1$ are H or organic groups. Organic amides such as carboxamides have n=1, E=carbon and x=1. Phosphoramides have n=2, E=phosphorous and x=1. Sulfonamides have n=1, E=sulfur and x=2. Polyamide polymers include aliphatic polyamides such as various forms of nylon. In certain embodiments of the first-third embodiments, the at least one adhesive polymer comprises at least one polyamide selected from: nylon 6, nylon 66, nylon 46, nylon 11, nylon 12, nylon 610, nylon 612, nylon 6/66 copolymer, nylon 6/66/610 copolymer, nylon MXD, nylon 6T, nylon 6/6T copolymer, nylon 66/PP copolymer, nylon 66/PPS copolymer, or a N-alkoxyalkylate thereof (e.g., methoxymethylate of 6-nylon, methoxymethylate of 6-610 nylon).

In certain embodiments of the first-third embodiments, the at least one adhesive polymer comprises a polyester. Generally, polyester polymers include the ester functional group in their backbone. Thermoplastic polyesters are generally saturated whereas thermoplastic polyesters are generally unsaturated. In certain embodiments of the first-third embodiments, the at least one adhesive polymer comprises at least one polyester selected from: polyethylene terephthalate (PET), polybutylene terephthalate (PBT), polyethylene isophthalate (PEI), PET/PEI copolymer, polybutylene naphthalate (PBN), liquid crystal polyeter, or polyoxyalkylene diimid diacid/polybutyrate terephthalate.

In certain embodiments of the first-third embodiments, the at least one adhesive polymer comprises a polynitrile. Generally, polynitrile polymers have repeat units of nitrile (i.e., —C≡N). Many polynitrile adhesive polymers are based upon acrylonitrile) and the polyacrylnitrile that results may optionally be copolymerized with other polymers such as styrene or styrene-butadiene. In certain embodiments of the first-third embodiments, the at least one adhesive polymer comprises at least one polynitrile selected from: polyacrylonitrile (PAN), polymethacrylonitrile, acrylonitrile/styrene copolymer (AS), methacrylonitrile/styrene copolymer, or methacrylonitrile/styrene/butadiene copolymer.

In certain embodiments of the first-third embodiments, the at least one adhesive polymer comprises a polyvinyl polymer. Generally, polyvinyl polymers are prepared from a vinyl monomer. In certain embodiments of the first-third embodiments, the at least one adhesive polymer comprises at least one polyvinyl polymer selected from: vinyl acetate, polyvinyl alcohol (PVA), vinyl alcohol/ethylene copolymer (EVOH), polyvinylidene chloride (PDVC), polyvinyl chloride (PVC), polyvinyl/polyvinylidene chloride copolymer, polyvinylidene chloride/methyl acrylate copolymer, or vinylidene chloride/acrylonitrile copolymer.

In certain embodiments of the first-third embodiments, the at least one adhesive polymer comprises a cellulose-based polymer. In certain embodiments of the first-third embodiments, the at least one adhesive polymer comprises at least one cellulose-based polymer selected from: cellulose acetate, cellulose acetate propionate, or cellulose acetate butyrate. In certain embodiments of the first-third embodiments, when the at least one adhesive polymer comprises a cellulose acetate type polymer, it is pre-treated prior to mixing with the silicone rubber for better miscibility.

In certain embodiments of the first-third embodiments, the at least one adhesive polymer comprises an a fluoro-based polymer. Exemplary fluoro-resins include fluorinated polyvinyls. In certain embodiments of the first-third embodiments, the at least one adhesive polymer comprises at least one fluoro-based polymer selected from: polyvinylidene fluoride (PVDF), polyvinyl fluoride (PVF), polycholorofluoroethylene (PCTFE), or tetrafluoroethylene/ethylene copolymer.

In certain embodiments of the first-third embodiments, the at least one adhesive polymer comprises an imide. Generally, imide polymers are formed from imide group containing monomers. An amide is a functional group consisting of two acyl groups bound to nitrogen and can be represented as —$R^1$—C(=O)—N($R^2$)—C(=O)—. In certain embodiments of the first-third embodiments, the at least one adhesive polymer comprises at least one imide polymer selected from: aromatic polyimide.

In certain embodiments of the first-third embodiments, the at least one adhesive polymer comprises a polyurethane. Generally, polyurethanes result from the polycondensation of an isocyanate with one or more polyols and can be aromatic or aliphatic. In certain embodiments of the first-third embodiments, the at least one adhesive polymer comprises at least one polyurethane selected from: polyester-polyurethane, polycarbonate-polyurethane, polyether-polyurethane, and polycaprolactone polyurethane.

In certain embodiments of the first-third embodiments, the at least one adhesive polymer comprises a phenol formaldehyde, a resorcinol-formaldehyde, or a combination thereof. Generally, phenol formaldehyde polymers are produced from the reaction of phenol or a substituted phenol with formaldehyde. Generally, resorcinol-formaldehyde polymers or resins are resorcinol (a benzene diol) and formaldehyde condensation products. In certain embodiments of the first-third embodiments, the at least one adhesive polymer comprises a phenol selected from: novolak or resole. In certain embodiments of the first-third embodiments, the at least one adhesive polymer comprises a resorcinol-formaldehyde selected from: resorcinol-formaldehyde resin, resorcinol-formaldehyde-styrene resin, or a combination thereof.

In certain embodiments of the first-third embodiments, the at least one adhesive polymer comprises a polyolefin. In certain embodiments of the first-third embodiments, the at least one adhesive polymer comprises a polyolefin selected from at least one of: polybutadiene rubber, natural rubber, polyisobutylene rubber, or isobutylene isoprene rubber; in certain such embodiments, the rubber has a number average molecular weight (as determined by GPC using a suitable standard such as polystyrene) of less than 100,000 grams/mole, less than 75,000 grams/mole, or less than 50,000 grams/mole. Suitable polybutadienes may include those having high vinyl contents (e.g., 90% and above). Suitable natural rubbers may include a blend of natural rubber with a thermoplastic polymer such as a polypropylene or a polyurethane.

Preparing a Tire Component with a Surface Coated with a Release Layer

As discussed above, the second embodiment disclosed herein is directed to a process for preparing a tire having at least one component with a surface coating coated with a release layer. The process comprises: (a) providing a tire component having an upper surface and lower surface wherein the lower surface is positioned radially inward within the tire, (b) providing a liquid mixture of at least one silicone rubber latex and at least one adhesive polymer latex, and (c) coating the lower surface of the tire component with the liquid mixture to provide a release layer thereon.

The particular method by which the liquid mixture of at least one silicone rubber latex and at least one adhesive polymer latex (e.g., for use in the first and second embodiments or to prepare the third embodiment) is prepared may vary. Generally, the liquid mixture can be prepared by combining the at least one silicone rubber latex and the at least one adhesive polymer latex into a container and blending the ingredients together. The at least one silicone rubber latex may be added first, the at least one adhesive polymer latex may be added first, or they may be added at the same time. Various forms of mixing can be utilized for the blending including various types of mixers. In certain embodiments (e.g., for use in the first and second embodiments or to prepare the third embodiment), the liquid mixture prepared by blending at room temperature (25° C.). In other embodiments (e.g., for use in the first and second embodiments or to prepare the third embodiment), the liquid mixture is prepared by blending at a temperature that is 5, 10, 15, 20, or more degrees above room temperature.

The particular method by which the lower surface of the tire component is coated with the liquid mixture (e.g., for use in the first and second embodiments or to prepare the third embodiment) to provide a release layer thereon may vary. Generally, the liquid mixture may be coated onto the lower surface of the tire component using any suitable method such as spraying, brushing, dipping, pouring, rolling, or a combination thereof. Spraying or other application methods enabling a relatively thin coating of the liquid mixture upon the lower surface of the tire component are preferred since a coating that is too thick can prevent adhesion. In certain embodiments of the first and second embodiments, the liquid mixture is coated onto the surface at a thickness of less than 1 millimeter, less than 0.5 millimeters, less than 0.4 millimeters, less than 0.3 millimeters, less than 0.2 millimeters, or less than 0.1 millimeters. In certain embodiments of the second and third embodiments, the release layer (i.e., the dried version of the liquid release layer) has a thickness of less than 1 millimeter, less than 0.5 millimeters, less than 0.4 millimeters, less than 0.3 millimeters, less than 0.2 millimeters, or less than 0.1 millimeters. less than 1 millimeter, less than 0.5 millimeters, less than 0.4 millimeters, less than 0.3 millimeters, less than 0.2 millimeters, or less than 0.1 millimeters.

Tires

As discussed above, the first, second and third embodiments disclosed herein are directed to a tire, a process for preparing a tire, and a cured tire. According to the first-third embodiments, the tire or cured tire (and, particularly the cured tire of the third embodiment or a cured tire resulting from curing of the tire of the first or second embodiment), may contain various components. Generally, a finished or cured tire will comprise a tread component which will contact the road or other operating surface upon which a vehicle fitted with the tire will be driven. In certain embodiments of the first-third embodiments, the tire or cured tire, contains at least one of the following components: (a) an inner liner, (b) a body ply, (c) a run-flat insert, (d) a sidewall, (e) a foam noise barrier, (f) a spray-on air barrier (e.g., upon the radially inner surface of a body ply), (g) sealant to prevent air leakage (e.g., coated upon the radially inner surface of a body ply and/or inner liner), or (h) a tread, wherein at least one of (a), (b), or (c) has a surface coated with the release layer described herein. In certain embodiments of the first-third embodiments, the tire or cured tire comprises at least (b), (d), and (h) and optionally at least one of (a), (f) or (g), wherein either (b) has a surface coated with the release layer described herein or (a) is present and has a surface coated with the release layer described herein. As those of skill in the art will appreciate, in certain embodiments of the first-third embodiments wherein at least one of (f) or (g) is present, it is possible for (a) to be omitted, although preferably when (g) is present (a) is also present.

The liquid mixture (or the liquid release layer) may be dried to form the release layer according to various methods. As non-limiting examples, the solvent within the liquid mixture (or liquid release layer) may be allowed to evaporate at ambient temperature and pressure. Alternatively, other methods of drying may be employed such as blowing air (ambient or heated) over the surface, subjecting to a heated environment, subjecting to negative pressure, or a combination thereof may be utilized to evaporate the solvents.

According to the first-third embodiments, the foam noise barrier (when present) may be made from various materials. Generally, a light-weight and low-density flexible material such as foamed rubber, foamed synthetic resin, or cellular plastic will be utilized for the foam noise barrier. According to the first-third embodiments, the foam noise barrier (when present) may comprise a foamed material (or spongy materials) that is either an open-cell type or a closed-cell type, although open-cell types are preferred. As non-limiting examples, the foamed material of the noise barrier may comprise a synthetic resin foam such as ether based polyurethane foam, ester based polyurethane foam, polyethylene foam and the like; rubber foam such as chloroprene rubber foam, ethylene-propylene rubber foam, nitrile rubber foam, silicone rubber foam, or a combination thereof. In certain embodiments of the first-third embodiments, the foam noise barrier (when present) comprises polyethylene foam, polyurethane foam, or a combination thereof. Generally, when a foam noise barrier is utilized in a tire, some type of adhesive will be used to adhere the foam noise barrier to the radially inner surface of the tire (e.g., the inner liner or a body ply having a spray-on air barrier or sealant) so as to minimize movement of the foam noise barrier within the tire. This adhesive may be applied to the foam noise barrier, to the radially inner surface of the tire to which the foam noise barrier will be adhered, or to both. In certain embodiments of the first-third embodiments, the foam noise barrier (when present) is adhered to the radially inner surface of the tire using a pressure sensitive adhesive (PSA); the pressure sensitive adhesive may be applied in various forms such as by coating (e.g., by dipping, rolling on, pressing on), extruding on, or by use of a PSA tape. Various materials may be used for the adhesive to adhere the foam noise barrier to the radially inner surface of the tire, and suitable adhesives, including suitable pressure sensitive adhesives, are known and commercially available. Generally, the adhesive should be compatible with the materials of the tire (e.g., the component to whose radially inner surface the foam noise barrier is adhered). In certain embodiments of the first-third embodiments, the adhesive for the foam noise barrier comprises at least one of the following: (1) rubber (e.g., natural rubber, butyl rubber, halobutyl rubber, polybutadiene rubber, styrene-butadiene rubber, or a combination thereof), (2) acrylic polymer (e.g., an acrylate made by copolymerizing one or more acrylic ester with one or more other monomers or one of those discussed above), (3) silicone rubber, (4) polyether adhesive, (5) polyurethane polymer; in certain such embodiments, the adhesive is a PSA. In certain embodiments of the first-third embodiments, when the foam noise barrier is present, the adhesive used to adhere the foam noise barrier and the adhesive polymer used in the release layer are comprised of the same type of polymer (e.g., both contain an acrylate polymer).

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the particular silicone rubber latex and adhesive polymer latex used in the following examples and their respective amounts should not be interpreted as limiting since other such ingredients and amounts consistent with the disclosure in the Detailed Description can be utilized in substitution. In other words, the particular latexes and their relative amounts as used in the following examples should be understood to apply to the more general content of the Detailed Description.

Examples 1-3

Three liquid mixtures were prepared or utilized. The liquid mixture of Example 1 constituted a silicone-rubber containing release agent purchased under the trade name Lyndcoat which is a liquid latex solution of silicone polymer that is milky-white in appearance. The liquid mixture of Example 2 constituted a release agent advertised as a non-silicone based release agent. The liquid mixture of Example 3 was prepared by mixing 60 parts of the silicone-rubber containing Lyndcoat product with 40 parts by weight of an aqueous solution of PMMA-containing latex (tradename Rovene 6005), and agitating (by hand) to blend. The PMMA-containing latex comprised about 50% by weight PMMA.

After preparation of the three (3) liquid mixtures, four (4) uncured innerliners were obtained and the outer surface of three of the innerliners was each thickly coated with one of the liquid mixtures using a foam sponge for application. After application of the coatings, each innerliner was dried by being placed in a negative pressure hood for approximately 24 hours. The fourth innerliner was not coated. After coating, the coated innerliners and the uncoated innerliner were each placed in a mold along with an uncured bladder, the mold was closed and heat and pressure were applied (10 tons of pressure for 15 minutes at 170° C.) to cure both the coated innerliner and the bladder. The molds were allowed to cure before opening. After opening of the mold and removal of the innerliner and bladder, testing was performed to qualitatively assess any adhesion between the innerliner and the bladder. Once separated, a sample of a pressure sensitive tape (obtained under the tradename Nitto and advertised for use in securing foam noise liners to tire innerliners) was applied to each of the treated innerliner surface to qualitatively assess adhesion of the tape to the innerliner surface.

Results are reported below in Table 1 wherein it can be seen that both the innerliner coated with a silicone rubber latex (Example 1) and the innerliner coated with a liquid mixture of silicone rubber latex and PMMA latex (Example 3) exhibited satisfactory separation of the innerliner and bladder. The innerliner coated with the liquid mixture of Example 2 was capable of being separated, but only with significant effort which was deemed to be unsatisfactory. The uncoated innerliner cured to the bladder and separation was not possible without tearing of one or both. As to the adhesion of the PSA tape, as can be seen in Table 1, the innerliner coated with a silicone rubber latex (Example 1) exhibited unsatisfactory performance in that the tape did not satisfactorily adhere. The PSA tape did satisfactorily adhere to both the uncoated innerliner and the innerliner that had been coated with the liquid mixture of Example 3. The innerliner that had been coated with the liquid mixture of Example 2 was not subjected to the PSA tape test or the surface friction test due the difficulty in separating the innerliner from the bladder. The surface friction test summarized in Table 1 was performed based upon touching the dried treated surface with a slick surface being deemed acceptable. Only the innerliner that had been coated with the liquid mixture of Example 3 exhibited both satisfactory separation from the bladder after co-curing as well as satisfactory adhesion of the PSA tape to the treated surface of the cured innerliner. Example 3 also was deemed acceptable for surface friction, according to the parameters discussed above. Thus, it was concluded that the use of a release layer comprising both silicone rubber and a adhesive polymer not only prevented unwanted adhesion of the bladder to the innerliner surface during curing, but also provided a cured surface to which PSA tape could satisfactorily adhere.

TABLE 1

|  | Untreated | Example 1 | Example 2 | Example 3 |
| --- | --- | --- | --- | --- |
| Separation after co-curing | X | ○ | X | ○ |
| Surface friction | X | ○ | N/A | ○ |
| Tape adhesion | ○ | X | N/A | ○ |

○ = performance acceptable
X = performance unacceptable

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A tire comprising at least one component having a surface coated with a liquid release layer comprising at least one silicone rubber latex and at least one adhesive polymer latex, wherein the liquid release layer contains silicone rubber in an amount of 5-25% by weight, based upon the total weight of the liquid release layer, adhesive polymer in an amount of 10-50% by weight, based upon the total weight of the liquid release layer, and no more than 10% by weight, based upon the total weight of the liquid release layer, of any filler selected from the group consisting of talc, kaolin, chalk, graphite, rock dust, mica, zinc oxide, titanium oxide, magnesium oxide, silica, calcium carbonate, alumina, carbon black, and combinations thereof.

2. The tire of claim 1, wherein the weight amount of silicone rubber to weight amount of adhesive polymer is at least 1:1.5.

3. The tire of claim 1, wherein the liquid release layer comprises an aqueous mixture of the at least one silicone rubber latex and at least one adhesive polymer latex.

4. The tire of claim 1, wherein the at least one component having a coated surface comprises at least one of an inner liner layer, a body ply, or a run-flat insert.

5. The tire of claim 2, wherein the at least one component having a coated surface comprises at least one of an inner liner layer, a body ply, or a run-flat insert.

6. The tire of claim 1, wherein the at least one adhesive polymer latex comprises at least one adhesive polymer selected from: acrylates, polyamides, polyesters, polynitriles, polyvinyls, cellulose-based, fluoro-based, imides, polyurethanes, phenol formaldehydes, polyolefins, and combinations thereof.

7. The tire of claim 1, wherein the liquid release layer contains no more than 5% by weight of hydrocarbon solvent, based upon the total weight of the liquid release layer.

8. The tire of claim 1, wherein the tire component having a coated surface comprises an inner liner layer comprising a majority by weight butyl rubber, optionally halogenated.

9. A process for preparing a tire comprising at least one component with a surface coated with a release layer, the process comprising:
   a. providing a tire component having an upper surface and lower surface wherein the lower surface is positioned radially inward within the tire,
   b. providing a liquid mixture of at least one silicone rubber latex and at least one adhesive polymer latex, and
   c. coating the lower surface of the tire component with the liquid mixture to provide a release layer thereon, wherein the liquid mixture contains silicone rubber in an amount of 5-25% by weight, based upon the total weight of the liquid mixture, adhesive polymer in an amount of 10-50% by weight, based upon the total weight of the liquid mixture, and no more than 10% by weight, based upon the total weight of the liquid mixture, of any filler selected from the group consisting of talc, kaolin, chalk, graphite, rock dust, mica, zinc oxide, titanium oxide, magnesium oxide, silica, calcium carbonate, alumina, carbon black, and combinations thereof.

10. The process of claim 9, wherein weight amount of silicone rubber to weight amount of adhesive polymer is at least 1:1.5.

11. The process of claim 9, wherein the at least one adhesive polymer latex comprises at least one adhesive polymer selected from: acrylates, polyamides, polyesters, polynitriles, polyvinyls, cellulose-based, fluoro-based, imides, polyurethanes, phenol formaldehydes, polyolefins, and combinations thereof.

12. The process of claim 9, wherein the at least one component with a surface coating comprises at least one of an inner liner layer, a body ply, or a run-flat insert.

13. The process of claim 9, wherein the liquid mixture contains no more than 5% by weight of hydrocarbon solvent, based upon the total weight of the liquid mixture.

14. The process of claim 9, wherein the at least one component with a surface coating comprises an inner liner layer comprising a majority by weight butyl rubber, optionally halogenated.

15. A cured tire comprising a tire body and at least one component with a surface coated with a release layer, the at least one the component selected from an inner liner, a body ply and a run-flat insert, wherein
   a. the component has an upper surface and lower surface with the lower surface positioned radially inward within the tire, wherein the lower surface is coated with a release layer comprising at least one silicone rubber and at least one adhesive polymer latex, and
   b. the upper surface of the component is positioned radially outward within the tire, wherein the release layer contains no more than 10% by weight, based upon the total weight of the release layer, of any filler selected from the group consisting of talc, kaolin, chalk, graphite, rock dust, mica, zinc oxide, titanium oxide, magnesium oxide, silica, calcium carbonate, alumina, carbon black, and combinations thereof.

16. The cured tire of claim 15, wherein the release layer contains a weight amount of silicone rubber to weight amount of adhesive polymer of at least 1:1.5.

17. The cured tire of claim 15, wherein the at least one adhesive polymer latex comprises at least one adhesive polymer selected from: acrylates, polyamides, polyesters, polynitriles, polyvinyls, cellulose-based, fluoro-based, imides, polyurethanes, phenol formaldehydes, polyolefins, and combinations thereof.

18. The cured tire of claim 15, wherein the release layer contains no more than 5% by weight, based upon the total weight of the release layer, of any filler selected from the group consisting of talc, kaolin, chalk, graphite, rock dust, mica, zinc oxide, titanium oxide, magnesium oxide, silica, calcium carbonate, alumina, and carbon black.

19. The cured tire of claim 15, wherein the at least one component with a coated surface comprises a rubber inner liner layer comprising a majority by weight butyl rubber, optionally halogenated.

20. The cured tire of claim 15, further comprising a foam noise damper, wherein the inner liner layer comprises its upper surface positioned radially outward within the tire, its lower coated surface positioned radially inward within the tire and the lower coated surface of the inner liner layer contacts the foam noise damper.

* * * * *